United States Patent
Greig

(10) Patent No.: US 6,345,431 B1
(45) Date of Patent: *Feb. 12, 2002

(54) JOINING THERMOPLASTIC PIPE TO A COUPLING

(75) Inventor: John Martyn Greig, Tyne & Wear (GB)

(73) Assignee: Lattice Intellectual Property Ltd., London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/553,321

(22) PCT Filed: Mar. 21, 1995

(86) PCT No.: PCT/GB95/00641

§ 371 Date: Nov. 20, 1995

§ 102(e) Date: Nov. 20, 1995

(87) PCT Pub. No.: WO95/25924

PCT Pub. Date: Sep. 28, 1995

(30) Foreign Application Priority Data

Mar. 22, 1994 (GB) .............................................. 9405636

(51) Int. Cl.[7] .............................................. B21D 39/00
(52) U.S. Cl. .............................. 29/506; 29/509; 29/516; 285/242; 285/259; 285/33
(58) Field of Search ..................... 29/506, 516, 525.08, 29/525.09; 285/242, 259, 256, 33, 23; 403/282, 281, 279

(56) References Cited

U.S. PATENT DOCUMENTS

| | | | | |
|---|---|---|---|---|
| 96,286 A | * | 10/1869 | Thompson | 285/256 |
| 2,260,454 A | * | 10/1941 | Hedeman | 285/242 |
| 2,319,024 A | * | 5/1943 | Wehringer | 285/256 |
| 2,797,474 A | * | 7/1957 | Main, Jr. | 29/506 |
| 3,740,832 A | * | 6/1973 | Toepper | 29/516 X |
| 4,208,067 A | * | 6/1980 | Ragout et al. | 285/242 |
| 4,238,132 A | * | 12/1980 | Palmaer | 285/259 X |
| 4,293,147 A | * | 10/1981 | Metcalfe et al. | 285/242 X |
| 4,738,154 A | * | 4/1988 | Hancock | 29/516 X |

* cited by examiner

Primary Examiner—S. Thomas Hughes
(74) Attorney, Agent, or Firm—Larson & Taylor PLC

(57) ABSTRACT

A coupling comprises a tubular insert (20), having an external shoulder (22) and external circumferential projections (26) separated by circumferential grooves (28, 30), and a tubular sleeve (14) having a largest internal diameter less than the external diameter of a pipe (10). The sleeve is advanced over the end (12) of the pipe and along the pipe away from the end. The pipe is constricted as the sleeve passes over it and then subsequently recovers to establish an end portion (18) which is unconstricted. The outside diameter of the insert is preferably not greater than the inner diameter of the pipe and the insert is inserted into the end portion of the pipe, the end of the pipe engaging the shoulder. The sleeve is then subjected to relative movement between said sleeve and said end until the end portion is gripped between the projections and the sleeve. The end of the sleeve preferably engages the shoulder (22). The coupling enables the pipe to be connected to other pipework.

8 Claims, 1 Drawing Sheet

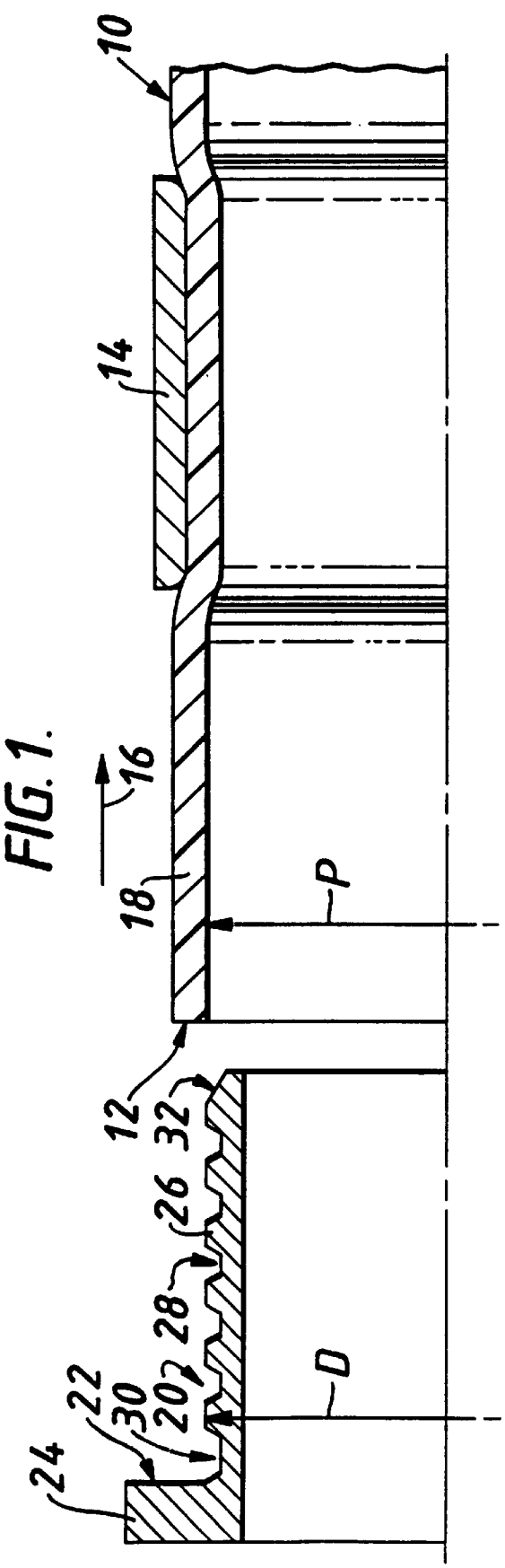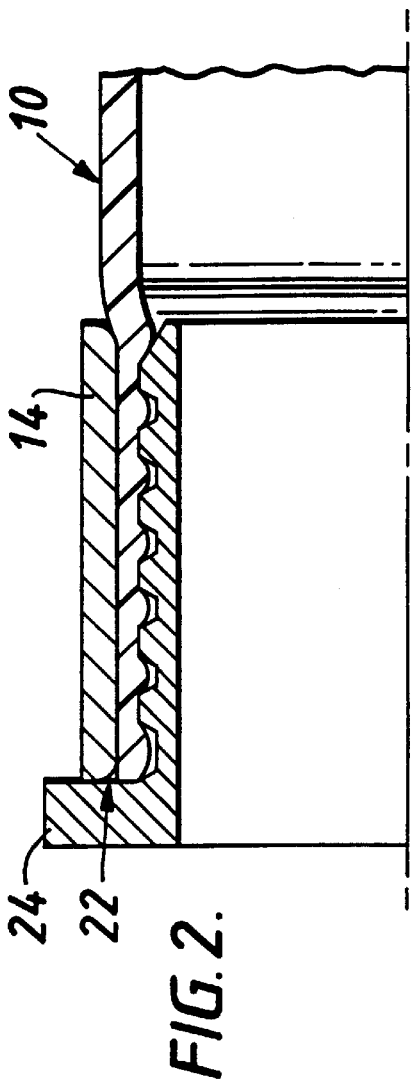

JOINING THERMOPLASTIC PIPE TO A COUPLING

The invention related to methods of joining thermoplastic pipes to couplings.

An example of such a method is disclosed in British patent specification number GB-A-1596112. That specification describes a pipe coupling which comprises an insert having a tubular body provided with a plurality of circumferential grooves in its outer surface, each groove having in axial section substantially straight sides and a straight base, the angle between the base and each side being obtuse, a pipe end into which the insert has been inserted, and a sleeve engaged around the pipe end such that the pipe end is compressed between the insert and the sleeve, characterised in that the diameter of the sleeve is not adjustable, the external diameter of the insert is greater than the internal diameter of the pipe in its free state, and the internal diameter of the sleeve is at least as great as the external diameter of the pipe in its free state.

The method of joining the thermoplastic pipe to the coupling comprises pushing the sleeve onto the pipe and away from the pipe end, the internal diameter of the sleeve being at least as great as the external diameter of the pipe, an insert is forced into the end of the pipe, the internal diameter of the pipe in its free state being less than the external diameter of the insert, whereby the external diameter of the pipe end around the insert is increased to be greater than the internal diameter of the sleeve, and the sleeve is forced to the end of the pipe so that the pipe end is tightly gripped between the insert and the sleeve.

In that method, the internal diameter of the sleeve is at least as great as the external diameter of the pipe in its free state.

Another example of such a method is disclosed in a specification published by the former German Democratic Republic numbered GDR-A-128216. The specification indicates that it is possible to taper the insert.

The invention is particularly, though not exclusively, concerned with joining reinforced pipes to couplings. The reinforcement prevents such pipes being expanded or only being capable of very small expansions. In the methods described in GB-A-1596112 and GDR-A-128216 the external diameter of the insert is sufficiently greater than the internal diameter of the pipe in its free state as to require substantial expansion of the pipe when the insert is pushed into the end of the pipe. On the other hand, the sleeve, which is pushed over the pipe end beforehand, is an easy fit on the external diameter of the pipe in its free state.

When the thermoplastic pipe is joined to the coupling the pipe is compressed between the sleeve having an internal diameter equal to or greater than the external diameter of the pipe and the insert which has an external diameter greater than the internal diameter of the pipe.

According to the invention, a method of joining a thermoplastic pipe to a coupling comprising a tubular insert having external circumferential projections separated by circumferential grooves and an external shoulder and a tubular sleeve having a largest internal diameter less than the external diameter of said pipe, comprises causing relative approach of said sleeve and said pipe said pipe being constricted as said sleeve passes over it and then subsequently recovering to establish an end portion of said pipe which is unconstricted by said sleeve, inserting said insert into said end portion, and causing relative movement between said sleeve and said end until said end portion is gripped between said projections and said sleeve.

An embodiment of the invention will now be described with reference to the accompanying drawings, in which FIG. 1 shows a stage in the method: and FIG. 2 shows a pipe fully assembled with the coupling.

FIG. 1 shows a thermoplastic pipe 10, typically a reinforced pipe though not necessarily so, over the end 12 of which has been passed a tubular sleeve 14. The largest internal diameter of the sleeve 14 is less than the external diameter of the pipe 10 in its free state. The advance of the sleeve 14 along the pipe 10 in the direction of the arrow 16 away from the end 12 constricts the pipe 10 as shown. The sleeve 14 is internally chamfered or radiused at each end.

The pipe 10 recovers, or almost wholly recovers, its original diameter after the sleeve 14 has passed and subsequently when the sleeve 14 has reached its final position as shown an end portion 18 is established which has recovered and is unconstricted by the sleeve 14.

FIG. 1 also shows a tubular insert 20 which forms a coupling with the sleeve 14 and which has an external circumferential shoulder 22, which in this example is formed as part of an external circumferential flange 24. The flange 24 would be engaged on the right as shown on the Figure by a loose flange (not shown) which has through-holes enabling the loose flange and the insert 20 (with the pipe 10 fully assembled to it) to be fastened to another flange (not shown) forming part of another component (not shown), such as pipework or a fitting or appliance to which it is desired to connect the pipe 10.

In a modification (not shown) the flange 24 may be a separate item from but welded to, the remainder of the insert 20. The shoulder 22 may be integral with the remainder of the insert 20 or may be integral with the flange 24, in that case.

The flange as such may, in a further modification (not shown), be omitted altogether but it is still necessary to retain the shoulder 22.

The insert 20 has circumferential projections 26 which are separated by circumferential grooves 28, 30. Each groove 28, 30 is preferably of trapezoidal shape. The groove 30 immediately adjacent the shoulder 22 is preferably wider than any other groove 28.

The insert 20 has an external taper 32 at its end opposite to the flange 24 to assist insertion of the insert 20 into the end 12 of the pipe 10.

The greatest external diameter of the insert measured at D is preferably not greater than the internal diameter P of the pipe measured in the recovered end portion 18. The internal diameter P will probably be slightly less than the internal diameter of the pipe 10 which has not been constricted by the sleeve 14. If the greatest external diameter D of the insert is greater than the internal diameter P of the pipe 10 it is not permitted to cause undue tensile strain in any reinforcement which the pipe 10 may have; or to cause undue tensile strain in the unreinforced pipe 10.

Following the stage of the method shown in FIG. 1, the insert 20 is inserted into the end 12 preferably until the end 12 of the pipe 10 engages the shoulder 22. Next, the sleeve 14 is retracted towards the end 12 of the pipe 10 preferably until the sleeve 14 engages the shoulder 22. The sleeve 14 again constricts the end portion 18 of the pipe 10 and the end portion 18 is gripped between the projections 26 and the sleeve 14. Some of the material of the pipe 10 between the insert 20 the sleeve 14 flows under the very high loads exerted by the sleeve 14 and is accommodated in the grooves 28, 30. Any build up of material as the sleeve 14 approaches the shoulder 22 is avoided by the provision of the wider groove 30.

The method of joining, as discussed above, leads to a fully leakproof assembly and the connection between the pipe 10 and the insert 20 is sufficiently strong to prevent the pipe 10 from being pulled loose under the loads imposed in use. The method is applicable to all pipes, including gas, water, oil, sewage and chemical pipes. The insert 20 and the sleeve 14 are made of steel or some other suitable strong material. In a modification (not shown), the insert 20 may be externally tapered, reducing in diameter away from the shoulder 22.

Apparatus (not shown) to assist in assembling the pipe 10 to the coupling 14, 20 may be used. Examples of such apparatus are shown or described in GB-A-1596112. It may be necessary to use a tubular member, which would engage the sleeve 14 during passage of the sleeve 14 in the direction of the arrow 16. After insertion of the insert 20, during retraction of the sleeve 14 towards the pipe end 12, a tubular member could be used (which would be splittable to enable it to be removed from the pipe 10 after use). Alternatively, the insert and pipe may be continued to be pushed in the direction of the arrow 16 while the sleeve 14 is held.

What is claimed is:

1. A method of joining a pipe to a coupling, said pipe being capable of being constricted and having in its free state an internal diameter and an external diameter, said coupling comprising a rigid tubular insert having external circumferential projections separated by circumferential grooves, and a rigid tubular sleeve having a fixed largest internal diameter less than the external free state diameter of said pipe, the method comprising: causing relative approach of said sleeve and said pipe to cause said sleeve to pass relatively over an end of said pipe to a temporary location remote from said end of said pipe, said external and internal free state diameters of said pipe being constricted as said sleeve passes over it and then subsequently recovering to establish an end portion of said pipe which is in a free state unconstricted by said sleeve, said unconstricted end portion extending from said end of said pipe to said sleeve; inserting said insert through said end of said pipe into said unconstricted end portion, the maximum outer diameter of said projections of said insert being at most equal to the internal free state diameter of said pipe; and causing relative movement of said sleeve toward said end of said pipe until said Pipe is gripped between said projections and said sleeve.

2. A method according to claim 1 wherein the maximum outer diameter of each of said projections is less than the least internal free state diameter of said pipe.

3. A method according to claim 1 wherein said rigid tubular insert comprises an external shoulder engageable with said end of said pipe.

4. A method according to claim 3 wherein said insert is inserted into said end portion until said end of said pipe engages said shoulder.

5. A method according to claim 3 wherein said insert has adjacent said shoulder a groove which is wider than any other of said grooves.

6. A method according to claim 5 wherein said relative movement of said sleeve toward said end is continued until said sleeve engages said shoulder.

7. A method according to claim 1 wherein said pipe is reinforced.

8. A method according to claim 7 wherein said pipe is a thermoplastic pipe.

* * * * *